United States Patent
Hidaka et al.

(10) Patent No.: US 10,312,846 B2
(45) Date of Patent: Jun. 4, 2019

(54) POLE-NUMBER-CHANGING ROTARY ELECTRIC MACHINE AND DRIVING METHOD FOR POLE-NUMBER-CHANGING ROTARY ELECTRIC MACHINE

(71) Applicant: MITSUBISHI ELECTRIC CORPORATION, Chiyoda-ku (JP)

(72) Inventors: Yuki Hidaka, Chiyoda-ku (JP); Taiga Komatsu, Chiyoda-ku (JP); Hideaki Arita, Chiyoda-ku (JP); Akihiro Daikoku, Chiyoda-ku (JP); Moriyuki Hazeyama, Chiyoda-ku (JP)

(73) Assignee: MITSUBISHI ELECTRIC CORPORATION, Chiyoda-ku (JP)

(*) Notice: Subject to any disclaimer, the term of this patent is extended or adjusted under 35 U.S.C. 154(b) by 0 days.

(21) Appl. No.: 15/537,508

(22) PCT Filed: Jan. 14, 2016

(86) PCT No.: PCT/JP2016/050993
§ 371 (c)(1),
(2) Date: Jun. 19, 2017

(87) PCT Pub. No.: WO2016/114353
PCT Pub. Date: Jul. 21, 2016

(65) Prior Publication Data
US 2017/0366129 A1 Dec. 21, 2017

(30) Foreign Application Priority Data
Jan. 16, 2015 (JP) .................................. 2015-006929

(51) Int. Cl.
*H02K 7/00* (2006.01)
*H02P 25/20* (2006.01)
(Continued)

(52) U.S. Cl.
CPC ............... *H02P 25/20* (2013.01); *H02K 3/12* (2013.01); *H02K 3/28* (2013.01); *H02K 17/14* (2013.01);
(Continued)

(58) Field of Classification Search
CPC ............ H02K 17/14; H02K 3/12; H02K 3/28; H02K 3/51; H02P 25/20; H02P 27/06
See application file for complete search history.

(56) References Cited

U.S. PATENT DOCUMENTS 6,008,616 A * 12/1999 Nagayama .......... B60L 11/1803
318/773
2003/0102764 A1 * 6/2003 Kusase .................... H02K 1/27
310/266
(Continued)

FOREIGN PATENT DOCUMENTS

JP 61-189194 A 8/1986
JP 63-161849 A 7/1988
(Continued)

OTHER PUBLICATIONS

International Search Report dated Mar. 8, 2016 in PCT/JP2016/050993, filed Jan. 14, 2016.

*Primary Examiner* — Muhammad S Islam
(74) *Attorney, Agent, or Firm* — Oblon, McClelland, Maier & Neustadt, L.L.P.

(57) ABSTRACT

A pole-number-changing rotary electric machine includes: a rotary electric machine; an n-group inverter; and a control unit for controlling the n-group inverter, wherein the control unit controls current phases of a current flowing through stator coils such that a current phase degree of freedom, which is a number of current phases per pole pair controllable by the n-group inverter, is equal to a number of groups n×a number of phases m/2 at a time of high polarity driving and the number of groups n×the number of phases m at a
(Continued)

time of low polarity driving, where the number of groups n is a multiple of 4 and the number of phases m is a natural number of 3 or more and relatively prime to the number of groups n.

10 Claims, 10 Drawing Sheets

(51) Int. Cl.
*H02P 27/06* (2006.01)
*H02K 17/14* (2006.01)
*H02K 3/12* (2006.01)
*H02K 3/28* (2006.01)
*H02P 25/22* (2006.01)
*H02K 3/51* (2006.01)
*H02K 3/52* (2006.01)
*H02K 11/028* (2016.01)

(52) U.S. Cl.
CPC .............. *H02P 25/22* (2013.01); *H02P 27/06* (2013.01); *H02K 3/51* (2013.01); *H02K 3/522* (2013.01); *H02K 11/028* (2013.01)

(56) References Cited

U.S. PATENT DOCUMENTS

2005/0029890 A1* 2/2005 Kadoya .................... B60K 6/26
                                                              310/180
2008/0197739 A1* 8/2008 Nashiki .................... H02K 1/06
                                                              310/156.55

FOREIGN PATENT DOCUMENTS

| JP | 07-322413 A | 12/1995 |
| JP | 07-336971 A | 12/1995 |
| JP | 08-223999 A | 8/1996 |
| JP | 10-098859 A | 4/1998 |
| JP | 11-018382 A | 1/1999 |
| JP | 2004-064893 A | 2/2004 |

* cited by examiner

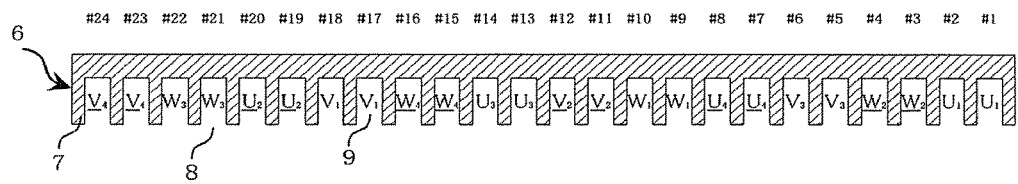
FIG. 3A  DURING HIGH POLARITY
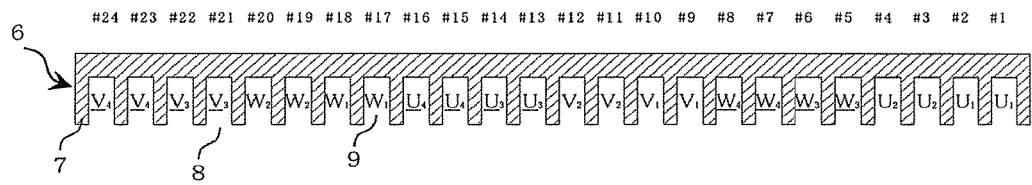
FIG. 3B  DURING LOW POLARITY

FIG. 4A  DURING HIGH POLARITY
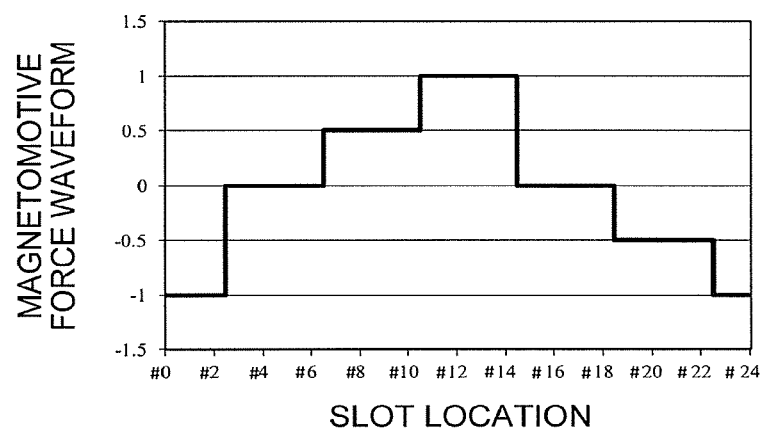
FIG. 4B  DURING LOW POLARITY

FIG. 5
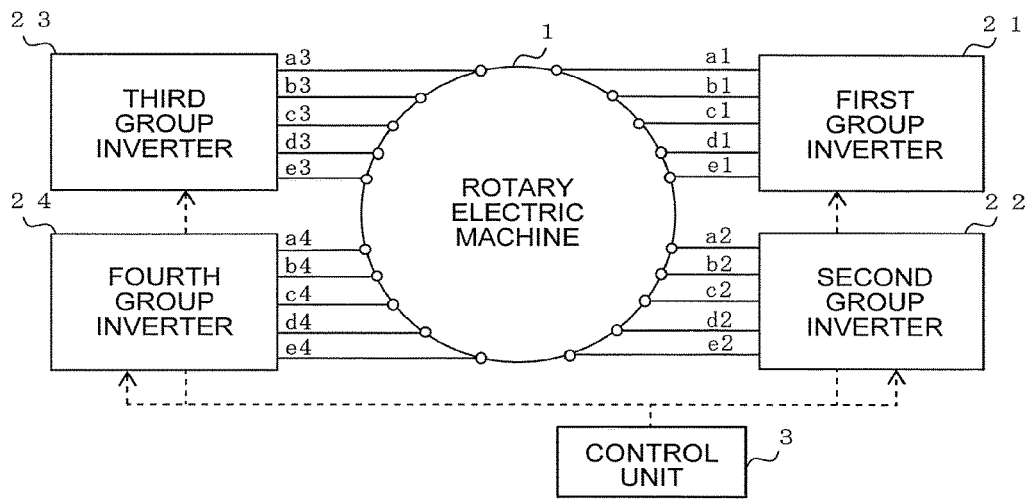
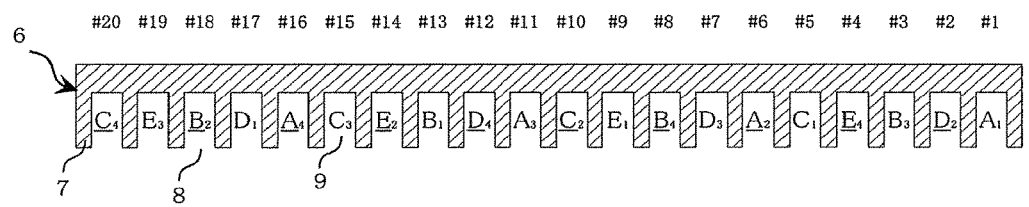
FIG. 6A  DURING HIGH POLARITY
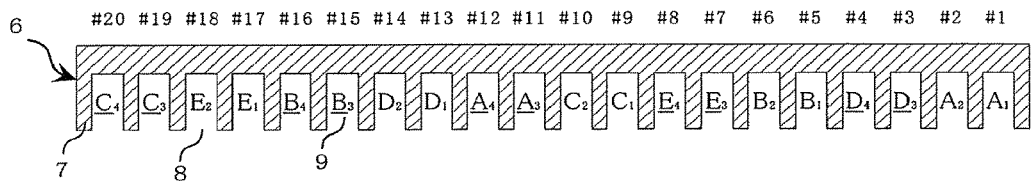
FIG. 6B  DURING LOW POLARITY

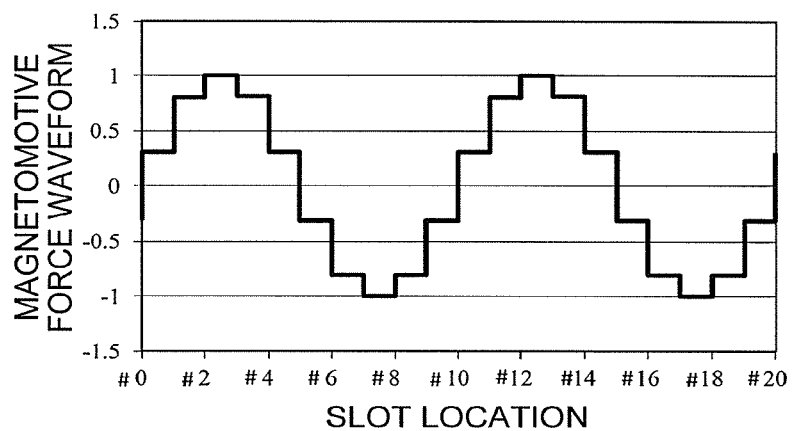
FIG. 7A  DURING HIGH POLARITY
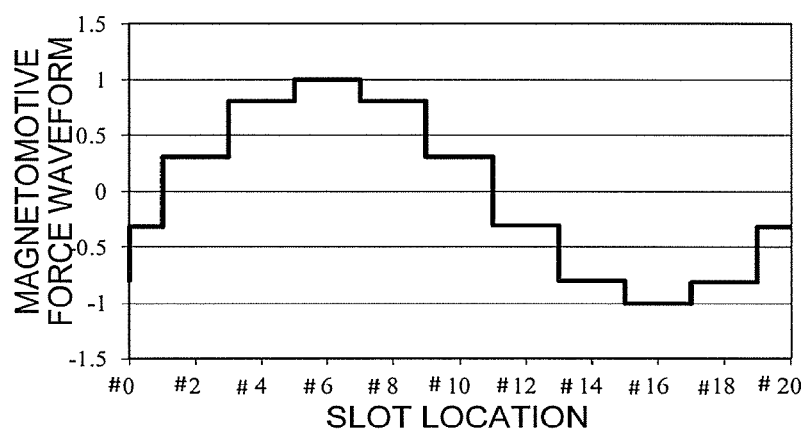
FIG. 7B  DURING LOW POLARITY

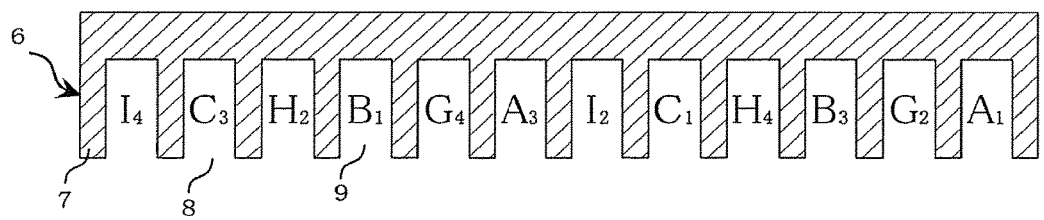
FIG. 8A DURING HIGH POLARITY
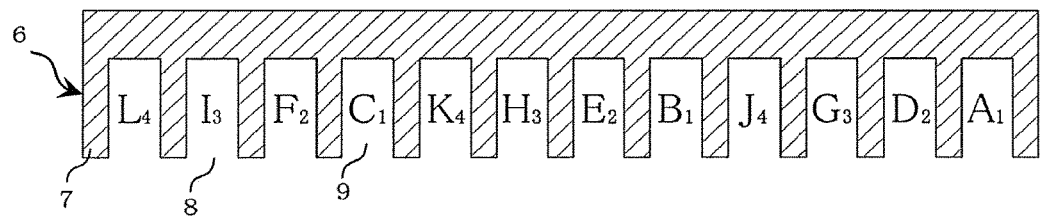
FIG. 8B DURING LOW POLARITY

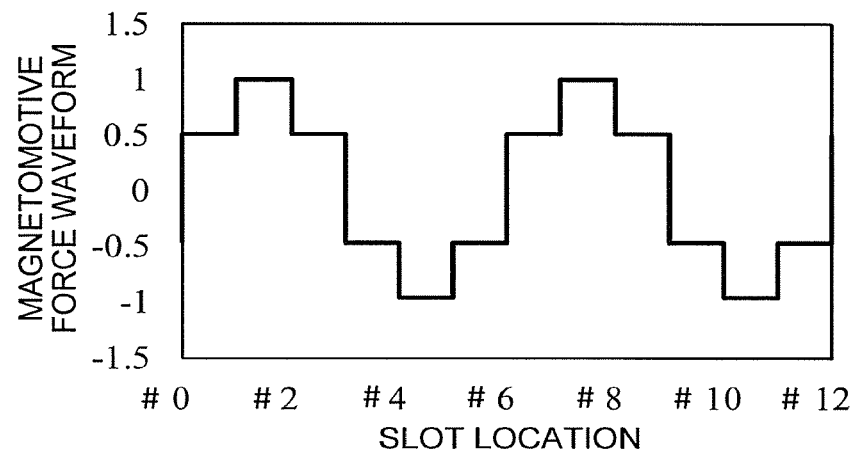
FIG. 9A  DURING HIGH POLARITY
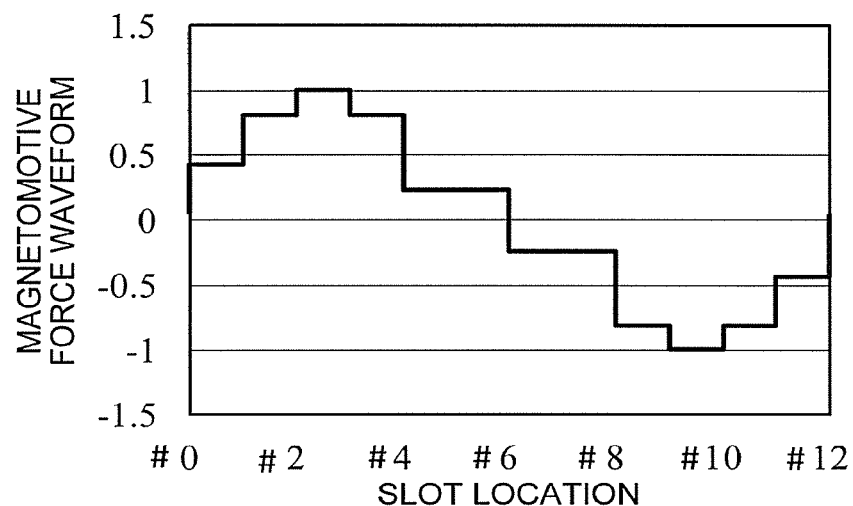
FIG. 9B  DURING LOW POLARITY

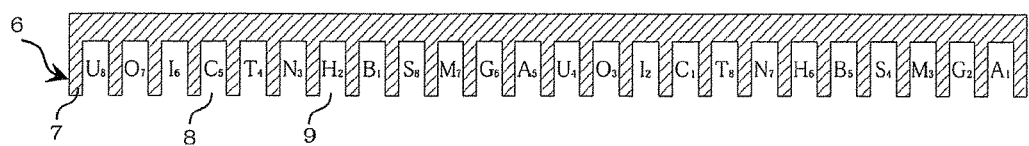
FIG. 11A DURING HIGH POLARITY
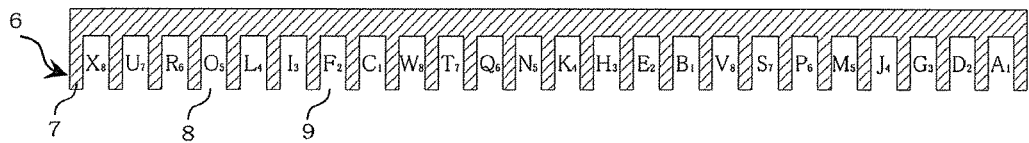
FIG. 11B DURING LOW POLARITY

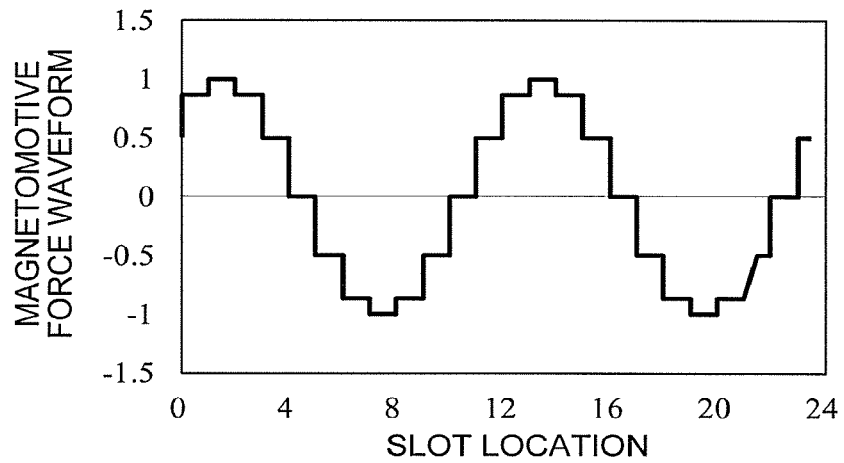
FIG. 12A DURING HIGH POLARITY
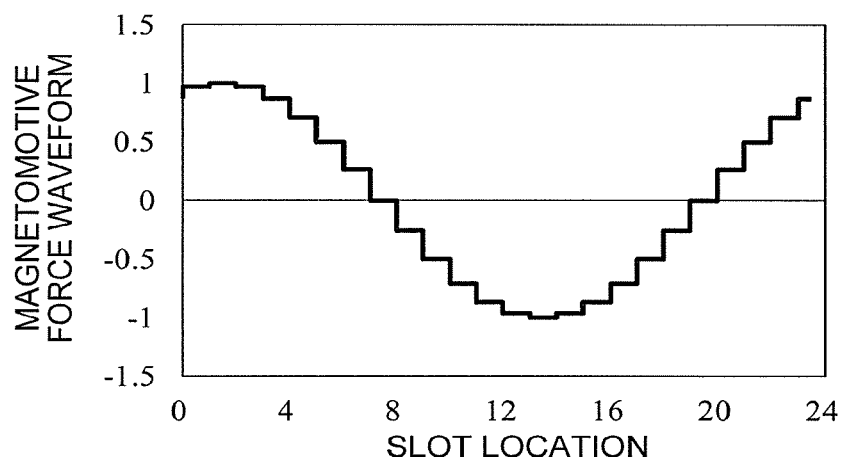
FIG. 12B DURING LOW POLARITY

POLE-NUMBER-CHANGING ROTARY ELECTRIC MACHINE AND DRIVING METHOD FOR POLE-NUMBER-CHANGING ROTARY ELECTRIC MACHINE

TECHNICAL FIELD

The present invention relates to a pole-number-changing rotary electric machine in which a number of poles is changed while driving in order to secure high torque and high output power over a wide range of rotational speeds, and a driving method for the pole-number-changing rotary electric machine.

BACKGROUND ART

Pole-number-changing rotary electric machines in which a number of poles is changed while driving in order to secure high torque and high output power over a wide range of rotational speeds are known as rotary electric machines to be used in electric vehicles, hybrid vehicles, and the like.

In one such conventional pole-number-changing rotary electric machine (see PTL 1, for example), three-phase coils are divided into two equal parts, and terminals are provided at ends of each coil except for a connecting portion, such that the coils having been divided into two equal parts form, for each phase, three phases and four poles. With PTL 1, in the case of two-pole drive, excitation coils in each slot are connected in series, and in the case of four-pole drive, connections of external coils of the excitation coils having been split into two equal parts are inverted and a power supply connection of the excitation coils of two phases is switched.

Further, in a separate conventional pole-number-changing rotary electric machine (see PTL 2, for example), six coils are arranged at 60-degree intervals, and mutually opposing coils are configured as a winding for one phase by being connected to each other so as to have the same polarity. With PTL 2, pole number changing of a rotary electric machine is performed by switching a phase sequence of a power supply voltage applied to three sets of three-phase windings configured in this way.

CITATION LIST

Patent Literature

[PTL 1] Japanese Patent Application Publication No. H10-98859
[PTL 2] Japanese Patent Application Publication No. H11-18382

SUMMARY OF INVENTION

Technical Problem

However, the problems described below exist in the prior art.

With the pole-number-changing rotary electric machine of PTL 1, a winding changeover mechanism for pole changing is required; hence, a number of parts increases and the pole-number-changing rotary electric machine becomes expensive.

Further, with PTL 2, a current phase degree of freedom, which is a number of current phases used in stator slots that corresponds to one pole pair, is three during high polarity, thus a winding factor is reduced and torque-current characteristics during high polarity deteriorate.

The present invention has been made to solve the above-mentioned problems, and an object thereof is to obtain a pole-number-changing rotary electric machine that, without using a winding changeover mechanism, has excellent torque-current characteristics even during high polarity, and a driving method for the pole-number-changing rotary electric machine.

Solution to Problem

A pole-number-changing rotary electric machine according to the present invention includes a rotary electric machine provided with a stator in which stator slots are arranged at regular intervals in a mechanical angle direction and a rotor rotated by magnetomotive forces generated by a current flowing through stator coils housed in the stator slots; an n-group inverter for supplying an m-phase current to the stator coils; and a control unit for controlling the n-group inverter, each of the magnetomotive forces corresponding to the stator slots being arranged at regular intervals, and a number of poles in the pole-number-changing rotary electric machine being changed between a time of high polarity driving and a time of low polarity driving, wherein the control unit controls current phases of the current flowing through the stator coils such that a current phase degree of freedom, which is a number of current phases per pole pair controllable by the n-group inverter, is equal to a number of groups n×a number of phases m/2 at the time of high polarity driving and the number of groups n×the number of phases m at the time of low polarity driving, where the number of groups n is a multiple of 4 and the number of phases m is a natural number of 3 or more and relatively prime to the number of groups n.

Further, a driving method for a pole-number-changing rotary electric machine according to the present invention is a driving method for a pole-number-changing rotary electric machine that includes a rotary electric machine provided with a stator in which stator slots are arranged at regular intervals in a mechanical angle direction and a rotor rotated by magnetomotive forces generated by a current flowing through stator coils housed in the stator slots; an n-group inverter for supplying an m-phase current to the stator coils; and a control unit for controlling the n-group inverter, each of the magnetomotive forces corresponding to the stator slots being arranged at regular intervals, and a number of poles in the pole-number-changing rotary electric machine being changed between a time of high polarity driving and a time of low polarity driving, wherein the control unit includes a current supply step in which an m-phase current is supplied to the stator coils by the n-group inverter, and in the current supply step, at the time of low polarity driving, current phases of the current flowing through the stator coils are controlled such that a current phase degree of freedom, which is a number of current phases per pole pair controllable by the n-group inverter, is equal to a number of groups n×a number of phases m, where the number of groups n is a multiple of 4 and the number of phases m is a natural number of 3 or more and relatively prime to the number of groups n and, at the time of high polarity driving, the current phases of the current flowing into the stator coils are changed such that the current phase degree of freedom is equal to the number of groups n×the number of phases m/2.

Advantageous Effects of Invention

With the present invention, current phases flowing through stator coils are switch controlled such that a current phase degree of freedom, which is a number of current phases per pole pair controllable by an n-group inverter, is equal to a number of groups n×a number of phases m/2 during high polarity and the number of groups n×the number of phases m during low polarity, where the number of groups n is a multiple of 4 and the number of phases m is a natural number of 3 or more and relatively prime to the number of groups n. As a result, it is possible to obtain a pole-number-changing rotary electric machine that, without using a winding changeover mechanism, has excellent torque-current characteristics even during high polarity, and a driving method for the pole-number-changing rotary electric machine.

BRIEF DESCRIPTION OF DRAWINGS

FIG. 3 is a pattern diagram showing current phase arrangements of stator coils in the pole-number-changing rotary electric machine according to the first embodiment of the present invention.

FIG. 4 is a pattern diagram showing magnetomotive force waveforms in the pole-number-changing rotary electric machine according to the first embodiment of the present invention.

FIG. 5 is an outline drawing showing connections between a rotary electric machine and inverters in a pole-number-changing rotary electric machine according to a second embodiment of the present invention.

FIG. 6 is a pattern diagram showing current phase arrangements of stator coils in the pole-number-changing rotary electric machine according to the second embodiment of the present invention.

FIG. 7 is a pattern diagram showing magnetomotive force waveforms in the pole-number-changing rotary electric machine according to the second embodiment of the present invention.

FIG. 8 is a pattern diagram showing current phase arrangements of stator coils in a pole-number-changing rotary electric machine according to a third embodiment of the present invention.

FIG. 9 is a pattern diagram showing magnetomotive force waveforms in the pole-number-changing rotary electric machine according to the third embodiment of the present invention.

FIG. 11 is a pattern diagram showing current phase arrangements of stator coils in a pole-number-changing rotary electric machine according to the fourth embodiment of the present invention.

FIG. 12 is a pattern diagram showing magnetomotive force waveforms in the pole-number-changing rotary electric machine according to the fourth embodiment of the present invention.

DESCRIPTION OF EMBODIMENTS

Figure 1:
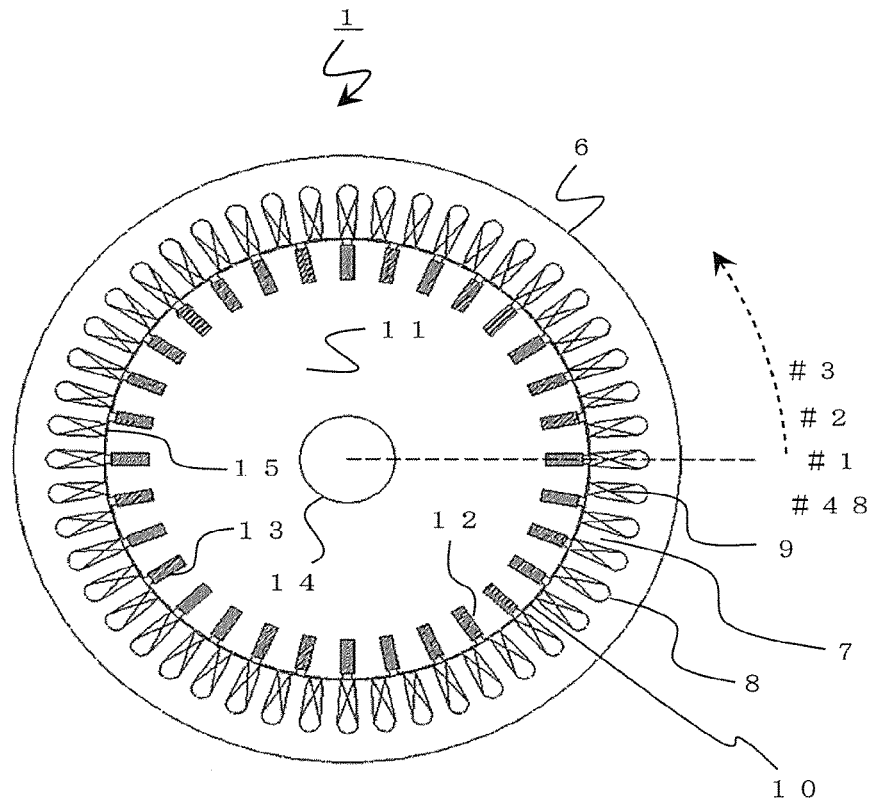
FIG. 1 is a cross-sectional view of a rotary electric machine according to a first embodiment of the present invention.

Preferred embodiments of a pole-number-changing rotary electric machine and a driving method for the pole-number-changing rotary electric machine in the present invention will be described hereinafter using the drawings. Note that identical or corresponding parts in each drawing will be denoted by identical reference numerals.

Example 1

First, a configuration of a pole-number-changing rotary electric machine in a first embodiment will be described. FIG. 1 is a cross-sectional view of a rotary electric machine 1 according to the first embodiment of the present invention. The rotary electric machine 1 is provided with a stator 6 and a rotor 10. Note that, although FIG. 1 shows an example in which the rotary electric machine 1 is an induction machine, the rotary electric machine 1 is not limited to an induction machine. The rotary electric machine 1 may also be, for example, a permanent magnet type synchronous rotary machine or a field winding type synchronous rotary machine.

The stator 6 of the rotary electric machine 1 shown in FIG. 1 has a cylindrical shape, and 48 stator slots 8 identified by slot numbers #1 to #48 are arranged on an inner periphery of the stator 6 at regular intervals in a mechanical angle direction. Further, stator coils 9 are housed in the stator slots 8. Stator teeth 7 are formed between the adjacent stator slots 8.

The rotor 10 of the rotary electric machine 1 shown in FIG. 1 has a cylindrical shape, and is provided with a rotor iron core 11. On an inner side of the stator 6, the rotor 10 is rotated, with a shaft passing through a shaft hole 14 serving as a rotation axis, by magnetomotive forces generated by a current flowing through the stator coils 9. Rotor slots 12 are arranged on an outer periphery of the rotor 10 at regular intervals in the mechanical angle direction, and secondary conductors 13 are housed in the rotor slots 12. A rotation gap 15 exists between the stator 6 and the rotor 10.

The rotary electric machine 1 is driven by an m-phase inverter constituted by n groups (not shown).

Figure 2:
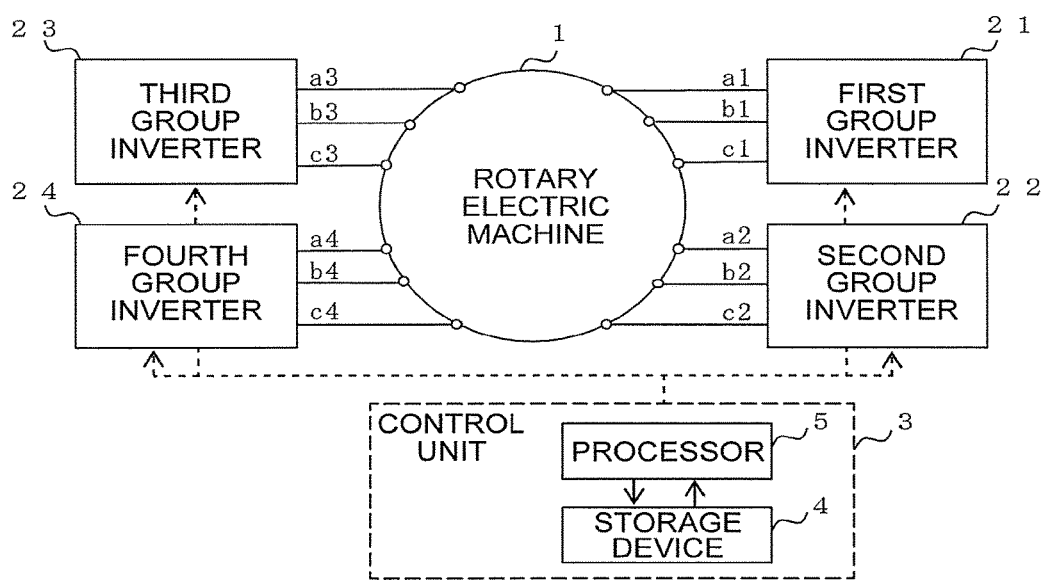
FIG. 2 is an outline drawing showing connections between the rotary electric machine and inverters in a pole-number-changing rotary electric machine according to the first embodiment of the present invention.

FIG. 2 is an outline drawing showing connections between the rotary electric machine 1 and inverters 21 to 24 in the pole-number-changing rotary electric machine according to the first embodiment of the present invention. The pole-number-changing rotary electric machine of the first embodiment is provided with the rotary electric machine 1, the inverters 21 to 24, and a control unit 3 of the inverters 21 to 24. The three-phase inverters 21 to 24 are constituted by 4 groups and supply current to the corresponding stator coils 9 of the rotary electric machine 1. Further, the inverters 21 to 24 are controlled by the control unit 3.

The stator coils 9 of the rotary electric machine 1 of the first embodiment have, as shown in FIG. 2, 4 groups×3 phases=12 lead-out ports, and current of respectively corresponding groups and phases (hereinafter referred to as "current phases") is supplied thereto from the 4-group 3-phase inverters 21 to 24.

That is to say, a first group (a1, b1, c1) of the stator coils 9 are connected to the inverter 21, a second group (a2, b2, c2) of the stator coils 9 are connected to the inverter 22, a third group (a3, b3, c3) of the stator coils 9 are connected to the inverter 23, and a fourth group (a4, b4, c4) of the stator coils 9 are connected to the inverter 24. Here, a1, b1, c1, a2, b2, c2, a3, b3, c3, a4, b4, and c4 are output line codes indicating a type of output line from the inverters to the motor.

Further, adjacent current phases in the first group (a1, b1, c1) are each separated by a phase difference of 360°/3=120°.

The same applies to the second group (a2, b2, c2), the third group (a3, b3, c3), and the fourth group (a4, b4, c4).

The control unit 3 is provided with, as hardware, a storage device 4 on which a program is stored, and a processor 5 for executing the program stored on the storage device 4. The control unit 3 is realized as, for example, a processing circuit such as a system LSI.

The storage device 4 includes a volatile storage device such as a random access memory and a nonvolatile auxiliary storage device such as a flash memory or a hard disk.

The processor 5 executes the program stored on the storage device 4. As the storage device 4 includes a volatile storage device and an auxiliary storage device, the processor 5 inputs the program from the auxiliary storage device via the volatile storage device.

Note that the processor 5 may output data such as calculation results to the volatile storage device of the storage device 4 or may store data in the auxiliary storage device via the volatile storage device.

Further, in the control unit 3, the abovementioned functions may be executed through cooperation between a plurality of processors 5 and a plurality of storage devices 4, or through cooperation among a plurality of processing circuits. The abovementioned functions may also be executed through cooperation between a combination of a plurality of processors 5 and a plurality of storage devices 4, and a plurality of processing circuits.

FIG. 3 is a pattern diagram showing current phase arrangements of the stator coils 9 in the pole-number-changing rotary electric machine according to the first embodiment of the present invention. FIG. 3A shows a current phase arrangement of two pole pairs during high polarity (8 poles), and FIG. 3B shows a current phase arrangement of one pole pair during low polarity (4 poles).

A number of stator slots=48 of the stator slots 8 are arranged in the stator 6 at regular intervals in the mechanical angle direction, and the stator coils 9 are housed in the stator slots 8. The stator teeth 7 are formed between the adjacent stator slots 8. Note that FIG. 3 shows only the current phase arrangement of the stator slots 8 #1 to #24 of #1 to #48.

The stator slots 8 are actually divided between an outer diameter side and an inner diameter side of the stator 6 such that, in many cases, some of the stator coils 9 having mutually different current phases are housed in the outer diameter side of the stator 6 and some of the stator coils 9 having mutually different current phases are housed in the inner diameter side of the stator 6, however, FIG. 3 only shows the current phases of the stator coils 9 in the outer diameter side.

The control unit 3 of the inverters 21 to 24 controls current phases flowing into the stator coils 9 such that current phase arrangements of the current flowing through the stator coils 9 during high polarity and during low polarity reflect the current phase arrangements shown in FIG. 3A and FIG. 3B respectively. Note that, in FIG. 3, underlined current phases indicate that a winding direction of the stator coils 9 is reversed with respect to current phases that are not underlined.

More specifically, the control unit 3 controls current phases of the current flowing through the stator coils 9 such that, in FIG. 3, a number of poles at a time of high polarity driving is twice a number of poles at a time of low polarity driving, and a number of different current phases used in the stator slots 8 that corresponds to one pole pair is the same at the time of high polarity driving and at the time of low polarity driving and equal to a number of groups n×a number of phases m/2=6.

Note that, although FIG. 3 shows the stator 6 in which the stator coils 9 are housed such that, during high polarity, both pole pitch and coil pitch reflect a full 6 slot pitch winding, the stator 6 of the first embodiment is not necessarily limited to such a configuration. In the first embodiment, any configuration in which a current phase degree of freedom, which is the number of current phases used in the stator slots that corresponds to one pole pair, is equal to the number of groups n×the number of phases m/2=6 during high polarity, and the number of groups n×the number of phases m=12 during low polarity is sufficient.

As a result, in FIG. 3, as a set of the stator coils 9 corresponding to one current phase is housed in every two of the stator slots 8, one pole pair is formed by 12 of the stator slots 8 during high polarity, and one pole pair is formed by 24 of the stator slots 8 during low polarity.

Next, an operation of the pole-number-changing rotary electric machine in the first embodiment will be described. Table 1 shows a current phase order of the current supplied to the rotary electric machine 1 by the inverters 21 to 24 in the pole-number-changing rotary electric machine according to the first embodiment of the present invention. The control unit 3 of the inverters 21 to 24 switch controls the current phases of the current flowing into the stator coils 9 of the rotary electric machine 1 in accordance with Table 1.

TABLE 1

|  | Output Line Code | High Polarity (8 poles) | Low Polarity (4 poles) |
| --- | --- | --- | --- |
| Group 1 Inverter | a1 | $U_1$ | $U_1$ |
|  | b1 | $V_1$ | $W_1$ |
|  | c1 | $W_1$ | $V_1$ |
| Group 2 Inverter | a2 | $U_2$ | $\underline{W_2}$ |
|  | b2 | $V_2$ | $\underline{V_2}$ |
|  | c2 | $W_2$ | $\underline{U_2}$ |
| Group 3 Inverter | a3 | $U_3$ | $\underline{U_3}$ |
|  | b3 | $V_3$ | $\underline{W_3}$ |
|  | c3 | $W_3$ | $\underline{V_3}$ |
| Group 4 Inverter | a4 | $U_4$ | $W_4$ |
|  | b4 | $V_4$ | $V_4$ |
|  | c4 | $W_4$ | $U_4$ |

Hence, switching control of the current phase arrangement of the stator coils 9 so as to reflect the current phase arrangement shown in FIG. 3A during high polarity and the current phase arrangement shown in FIG. 3B during low polarity, can be realized without using a winding changeover mechanism.

FIG. 4 is a pattern diagram showing magnetomotive force waveforms in the pole-number-changing rotary electric machine according to the first embodiment of the present invention. FIG. 4A shows a magnetomotive force waveform of the current phase arrangement during high polarity shown in FIG. 3A, and FIG. 4B shows a magnetomotive force waveform of the current phase arrangement during low polarity shown in FIG. 3B.

The horizontal axis in FIG. 4 indicates slot numbers of the stator slots 8 indicated thereabove. The vertical axis in FIG. 4 indicates magnetomotive forces at locations corresponding to each slot number of the stator slots 8 and normalized such that a maximum value thereof is 1. In the present invention, each of the magnetomotive forces corresponding to the stator slots 8 are arranged at regular intervals.

Note that, for the magnetomotive force waveforms shown in FIG. 4, a number of coil turns is the same for all the stator coils 9 in the stator slots 8, and I, −I/2, and −I/2 currents are flowing through a U phase, a V phase, and a W phase respectively. In other words, absolute values of the magnetomotive forces generated by the stator coils 9 and corresponding to each of the stator slots 8 are all the same.

It can be understood that, when a spatial order of a slot half cycle (#1-#24) is k (k being a natural number), the magnetomotive force waveform during high polarity shown in FIG. 4A is a waveform mainly including a spatial order of 2 k, whereas the magnetomotive force waveform during low polarity shown in FIG. 4B is a waveform mainly including a spatial order of k.

In other words, it can be understood that the control unit 3 of the inverters 21 to 24 switch controls the current phases of the current flowing into the stator coils 9 of the rotary electric machine 1 in accordance with Table 1, whereby switching control of the current phase arrangement of the stator coils 9 between high polarity (8 poles), and low polarity (4 poles) is realized.

Note that the absolute values of the magnetomotive forces generated by the stator coils 9 and corresponding to each of the stator slots 8 do not necessarily all have to be the same. Any configuration in which a magnetomotive force waveform during low polarity is a waveform mainly including a spatial order of k with respect to a waveform during high polarity including a spatial order of 2 k is sufficient.

Next, effects of the pole-number-changing rotary electric machine in the first embodiment will be described. In the rotary electric machine 1 of the first embodiment shown in FIG. 3, a number of stator slots corresponding to each pole/each phase is 2. In other words, a set of the stator coils 9 corresponding to one current phase is housed in every two consecutive slots. Furthermore, the number of phases m is equal to 3.

Hence, with the first embodiment, as the current phase degree of freedom, which is the number of current phases per pole pair controllable by the n-group inverter, is 6 at the time of high polarity driving, the current phase degree of freedom can be improved over conventional pole-number-changing rotary electric machines (in PTL 2, for example, a current phase degree of freedom=3). As a result, a phase difference between mutually adjacent different current phases can be set to 360°/6=60°, allowing a winding factor of the rotary electric machine 1 to be improved.

A specific winding factor is calculated by finding the product of a distributed winding factor and a short winding factor, however, with the first embodiment, the short winding factor=1, so the distributed winding factor is equal to the winding factor. Here, the distributed winding factor $k_{wd}$ is expressed by equation (1) below using q, which is the number of stator slots that correspond to each pole/each phase.

$$K_{wd} = \sin(\pi/6)/(q \times \sin(\pi/6q)) \quad (1)$$

In the pole-number-changing rotary electric machine shown in FIG. 3, the number of stator slots corresponding to each pole/each phase is assumed to be 2, therefore, a high value of 0.966 can be obtained as the distributed winding factor $k_{wd}$. Further, by setting the number of stator slots to 24, it is also possible to make q=1 and, in this case, the distributed winding factor $k_{wd}$ would reflect a maximum value of 1. However, as described above, with PTL 2, the current phase degree of freedom during high polarity is 3, therefore, if a winding factor is calculated under the same conditions as in the first embodiment, the winding factor reflects a low value of 0.866, which is the same as a 2 pole, 3 slot series winding factor.

With the first embodiment, a winding factor and the current phase degree of freedom during high polarity can be improved in this way, such that, even during high polarity, excellent torque-current characteristics can be obtained.

Moreover, just by switch controlling the current phases flowing into the stator coils 9 of the rotary electric machine 1 in accordance with table 1, the control unit 3 of the inverters 21 to 24 realizes, without the addition of a winding changeover mechanism, a pole-number-changing rotary electric machine, allowing a number of parts and an increase in cost to be suppressed.

Specifically, in hybrid vehicles or the like that propel a vehicle by assisting a driving force of an engine using a motor, when a propulsive force of a vehicle is constant, vehicles receiving a larger amount of assistance from the motor are able to manage with a smaller engine driving force, allowing fuel economy performance to be improved.

For example, when a vehicle accelerates from a stationary state or a low-speed running state using a constant propulsive force, by changing current phases to reflect high polarity, excellent torque-current characteristics can be obtained not only at low-speed running when a rotational frequency of the engine is low, but also at high-speed running when the rotational frequency of the engine is high, allowing fuel economy performance to be improved.

As described above, with the first embodiment, current phases flowing into the stator coils are switch controlled such that the current phase degree of freedom, which is the number of current phases per pole pair controllable by the inverters 21 to 24, is equal to the number of groups n×the number of phases m/2=6 during high polarity, and the number of groups n×the number of phases m=12 during low polarity. As a result, a pole-number-changing rotary electric machine that, without using a winding changeover mechanism, has excellent torque-current characteristics even during high polarity, and a driving method for the pole-number-changing rotary electric machine, can be obtained.

Example 2

FIG. 5 is an outline drawing showing connections between a rotary electric machine 1 and inverters 21-24 in a pole-number-changing rotary electric machine according to a second embodiment of the present invention. The pole-number-changing rotary electric machine of the second embodiment, in comparison to the pole-number-changing rotary electric machine of the first embodiment shown in FIG. 2, differs mainly in that inverters 21 to 24 supply 5-phase current instead of 3-phase current. A configuration of a control unit 3 is the same as that of the first embodiment.

First, a configuration of the pole-number-changing rotary electric machine in the second embodiment will be described. Stator coils 9 of the rotary electric machine 1 of the second embodiment have, as shown in FIG. 5, 4 groups×5 phases=20 lead-out ports, and current having respectively corresponding current phases is supplied thereto from the 4-group 5-phase inverters 21 to 24.

That is to say, a first group (a1, b1, c1, d1, e1) of the stator coils 9 are connected to the inverter 21, a second group (a2, b2, c2, d2, e2) of the stator coils 9 are connected to the inverter 22, a third group (a3, b3, c3, d3, e3) of the stator coils 9 are connected to the inverter 23, and a fourth group (a4, b4, c4, d4, e4) of the stator coils 9 are connected to the inverter 24. Here, in the same way as in the first embodiment, d1, e1, d2, e2, d3, e3, d4, and e4, are output line codes indicating a type of output line from the inverters to the motor.

Further, adjacent current phases in the first group (a1, b1, c1, d1, e1) are each separated by a phase difference of 360°/5=72°. The same applies to the second group (a2, b2, c2, d2, e2), the third group (a3, b3, c3, d3, e3), and the fourth group (a4, b4, c4, d4, e4).

FIG. 6 is a pattern diagram showing current phase arrangements of the stator coils 9 in the pole-number-changing rotary electric machine according to the second embodiment of the present invention. FIG. 6A shows a current phase arrangement of two pole pairs during high polarity (4 poles), and FIG. 6B shows a current phase arrangement of one pole pair during low polarity (2 poles).

A number of stator slots=20 stator slots 8 are arranged in a stator 6 at regular intervals in the mechanical angle direction, and the stator coils 9 are housed in the stator slots 8.

The control unit 3 of the inverters 21 to 24 controls current phases flowing into the stator coils 9 such that current phase arrangements of the current flowing through the stator coils 9 during high polarity and during low polarity reflect the current phase arrangements shown in FIG. 6A and FIG. 6B respectively.

More specifically, the control unit 3 controls current phases of the current flowing through the stator coils 9 such that, in FIG. 6, a number of poles at a time of high polarity driving is twice a number of poles at a time of low polarity driving, and a number of different current phases used in the stator slots 8 that corresponds to one pole pair is the same at the time of high polarity driving and at the time of low polarity driving and equal to a number of groups n×a number of phases m/2=10.

Note that, although FIG. 6 shows the stator 6 in which the stator coils 9 are housed such that, during high polarity, both pole pitch and coil pitch reflect a full 5 slot pitch winding, the stator 6 of the second embodiment is not necessarily limited to such a configuration. In the second embodiment, any configuration in which a current phase degree of freedom is equal to the number of groups n×the number of phases m/2=10 during high polarity, and the number of groups n×the number of phases m=20 during low polarity is sufficient.

Next, an operation of the pole-number-changing rotary electric machine in the second embodiment will be described. Table 2 shows a current phase order of the current supplied to the rotary electric machine 1 by the inverters 21 to 24 in the pole-number-changing rotary electric machine according to the second embodiment of the present invention. The control unit 3 of the inverters 21 to 24 switch controls the current phases of the current flowing into the stator coils 9 of the rotary electric machine 1 in accordance with Table 2.

TABLE 2

|  | Output Line Code | High Polarity (4 poles) | Low Polarity (2 poles) |
| --- | --- | --- | --- |
| Group 1 Inverter | a1 | $A_1$ | $A_1$ |
|  | b1 | $B_1$ | $D_1$ |
|  | c1 | $C_1$ | $B_1$ |
|  | d1 | $D_1$ | $E_1$ |
|  | e1 | $E_1$ | $C_1$ |
| Group 2 Inverter | a2 | $A_2$ | $B_2$ |
|  | b2 | $B_2$ | $E_2$ |
|  | c2 | $C_2$ | $C_2$ |
|  | d2 | $D_2$ | $A_2$ |
|  | e2 | $E_2$ | $D_2$ |
| Group 3 Inverter | a3 | $A_3$ | $A_3$ |
|  | b3 | $B_3$ | $D_3$ |
|  | c3 | $C_3$ | $B_3$ |
|  | d3 | $D_3$ | $E_3$ |
|  | e3 | $E_3$ | $C_3$ |

TABLE 2-continued

|  | Output Line Code | High Polarity (4 poles) | Low Polarity (2 poles) |
| --- | --- | --- | --- |
| Group 4 Inverter | a4 | $A_4$ | $B_4$ |
|  | b4 | $B_4$ | $E_4$ |
|  | c4 | $C_4$ | $C_4$ |
|  | d4 | $D_4$ | $A_4$ |
|  | e4 | $E_4$ | $D_4$ |

Hence, switching control of the current phase arrangement of the stator coils 9 so as to reflect the current phase arrangement shown in FIG. 6A during high polarity and the current phase arrangement shown in FIG. 6B during low polarity, can be realized without using a winding changeover mechanism.

FIG. 7 is a pattern diagram showing magnetomotive force waveforms in the pole-number-changing rotary electric machine according to the second embodiment of the present invention. FIG. 7A shows a magnetomotive force waveform of the current phase arrangement during high polarity shown in FIG. 6A, and FIG. 7B shows a magnetomotive force waveform of the current phase arrangement during low polarity shown in FIG. 6B.

Note that, for the magnetomotive force waveforms shown in FIG. 7, a number of coil turns is the same for all the stator coils 9 in the stator slots 8, and I×cos (0°), I×cos (72°), I×cos (144°), I×cos (216°), and I×cos (288°) currents are flowing through an A phase, a B phase, a C phase, a D phase, and an E phase respectively. In other words, absolute values of the magnetomotive forces generated by the stator coils 9 and corresponding to each of the stator slots 8 are all the same.

It can be understood that, when a spatial order of a slot full cycle (#1-#20) is k (k being a natural number), the magnetomotive force waveform during high polarity shown in FIG. 7A is a waveform mainly including a spatial order of 2 k, whereas the magnetomotive force waveform during low polarity shown in FIG. 7B is a waveform mainly including a spatial order of k.

In other words, it can be understood that the control unit 3 of the inverters 21 to 24 switch controls the current phases of the current flowing into the stator coils 9 of the rotary electric machine 1 in accordance with Table 2, whereby switching control of the current phase arrangement of the stator coils 9 between high polarity (4 poles), and low polarity (2 poles) is realized.

Next, effects of the pole-number-changing rotary electric machine in the second embodiment will be described. In the rotary electric machine 1 of the second embodiment shown in FIG. 6, a number of stator slots corresponding to each pole/each phase is 1. Furthermore, the number of phases m is equal to 5.

Hence, with the second embodiment, as the current phase degree of freedom, which is the number of current phases per pole pair controllable by the n-group inverter, is 10 at the time of high polarity driving, the current phase degree of freedom can be improved over conventional pole-number-changing rotary electric machines (in PTL 2, for example, a current phase degree of freedom=5). As a result, a phase difference between mutually adjacent different current phases can be set to 360°/10=36°, allowing a winding factor of the rotary electric machine 1 to be improved.

In the pole-number-changing rotary electric machine shown in FIG. 6, the number of stator slots corresponding to each pole/each phase is assumed to be 1, therefore, a maximum value of 1 can be obtained as a distributed winding factor $k_{wd}$. However, with PTL 2, the current phase degree of freedom during high polarity is 5, therefore, if a winding factor is calculated under the same conditions as in the second embodiment, the winding factor reflects a low value of 0.588.

As described above, with the second embodiment, the current phases flowing into the stator coils are switch controlled such that the current phase degree of freedom, which is the number of current phases per pole pair controllable by the inverters 21 to 24, is equal to the number of groups n×the number of phases m/2=10 during high polarity, and the number of groups n×the number of phases m=20 during low polarity. As a result, a pole-number-changing rotary electric machine that, without using a winding changeover mechanism, has excellent torque-current characteristics even during high polarity, and a driving method for the pole-number-changing rotary electric machine, can be obtained.

Example 3

Stator coils 9 of a rotary electric machine 1 according to a third embodiment have, as shown in FIG. 2, 4 groups×3 phases=12 lead-out ports, and current of respectively corresponding groups and phases is supplied thereto from 4-group 3-phase inverters 21 to 24.

First, a configuration of a pole-number-changing rotary electric machine in the third embodiment will be described. The stator coils 9 of the rotary electric machine 1 of the third embodiment have, as shown in FIG. 2, 4 groups×3 phases=12 lead-out ports, and current having respectively corresponding current phases is supplied thereto from the 4-group 3-phase inverters 21 to 24.

That is to say, a first group (a1, b1, c1) of the stator coils 9 are connected to the inverter 21, a second group (a2, b2, c2) of the stator coils 9 are connected to the inverter 22, a third group (a3, b3, c3) of the stator coils 9 are connected to the inverter 23, and a fourth group (a4, b4, c4) of the stator coils 9 are connected to the inverter 24.

Further, adjacent current phases in the first group (a1, b1, c1) are each separated by a phase difference of 360°/3=120°. The same applies to the second group (a2, b2, c2), the third group (a3, b3, c3), and the fourth group (a4, b4, c4).

FIG. 8 is a pattern diagram showing current phase arrangements of the stator coils 9 in the pole-number-changing rotary electric machine according to the third embodiment of the present invention. FIG. 8A shows a current phase arrangement of two pole pairs during high polarity (4 poles), and FIG. 8B shows a current phase arrangement of one pole pair during low polarity (2 poles).

A number of stator slots=12 stator slots 8 are arranged in a stator 6 at regular intervals in the mechanical angle direction, and the stator coils 9 are housed in the stator slots 8.

A control unit 3 of the inverters 21 to 24 controls current phases flowing into the stator coils 9 such that current phase arrangements of the current flowing through the stator coils 9 during high polarity and during low polarity reflect the current phase arrangements shown in FIG. 8A and FIG. 8B respectively.

More specifically, the control unit 3 controls current phases of the current flowing through the stator coils 9 such that, in FIG. 8, a number of poles at a time of high polarity driving is twice a number of poles at a time of low polarity driving, and a number of different current phases used in the stator slots 8 that corresponds to one pole pair is equal to a number of groups n×a number of phases m/2=6 at the time of high polarity driving and the number of groups n×the number of phases m=12 at the time of low polarity driving.

Next, an operation of the pole-number-changing rotary electric machine in the third embodiment will be described. Table 3 shows a current phase order of the current supplied to the rotary electric machine 1 by the inverters 21 to 24 in the pole-number-changing rotary electric machine according to the third embodiment of the present invention. The control unit 3 of the inverters 21 to 24 switch controls the current phases of the current flowing into the stator coils 9 of the rotary electric machine 1 in accordance with Table 3.

TABLE 3

|  | Output Line Code | High Polarity (4 poles) | Low Polarity (2 poles) |
|---|---|---|---|
| Group 1 Inverter | a1 | $A_1$ | $A_1$ |
|  | b1 | $B_1$ | $C_1$ |
|  | c1 | $C_1$ | $B_1$ |
| Group 2 Inverter | a2 | $G_2$ | $D_2$ |
|  | b2 | $H_2$ | $F_2$ |
|  | c2 | $I_2$ | $E_2$ |
| Group 3 Inverter | a3 | $A_3$ | $H_3$ |
|  | b3 | $B_3$ | $G_3$ |
|  | c3 | $C_3$ | $I_3$ |
| Group 4 Inverter | a4 | $G_4$ | $K_4$ |
|  | b4 | $H_4$ | $J_4$ |
|  | c4 | $I_4$ | $L_4$ |

Hence, switching control of the current phase arrangement of the stator coils 9 so as to reflect the current phase arrangement shown in FIG. 8A during high polarity and the current phase arrangement shown in FIG. 8B during low polarity, can be realized without using a winding changeover mechanism.

FIG. 9 is a pattern diagram showing magnetomotive force waveforms in the pole-number-changing rotary electric machine according to the third embodiment of the present invention. FIG. 9A shows a magnetomotive force waveform of the current phase arrangement during high polarity shown in FIG. 8A, and FIG. 9B shows a magnetomotive force waveform of the current phase arrangement during low polarity shown in FIG. 8B.

Note that, for the magnetomotive force waveforms shown in FIG. 9, a number of coil turns is the same for all the stator coils 9 in the stator slots 8, and I×cos(0°), I×cos(−120°), I×cos(−240°), I×cos(−30°), I×cos(−150°), I×cos(−270°), I×cos(−60°), I×cos(−180°), I×cos(−300°), I×cos(−90°), I×cos(−210°), and I×cos(−330°) currents are flowing through an A phase, a B phase, a C phase, a D phase, an E phase, an F phase, a G phase, an H phase, an I phase, a J phase, a K phase, and an L phase respectively. In other words, absolute values of the magnetomotive forces generated by the stator coils 9 and corresponding to each of the stator slots 8 are all the same.

It can be understood that, when a spatial order of a slot full cycle (#1-#12) is k (k being a natural number), the magnetomotive force waveform during high polarity shown in FIG. 9A is a waveform mainly including a spatial order of 2 k, whereas the magnetomotive force waveform during low polarity shown in FIG. 9B is a waveform mainly including a spatial order of k.

In other words, it can be understood that the control unit 3 of the inverters 21 to 24 switch controls the current phases of the current flowing into the stator coils 9 of the rotary electric machine 1 in accordance with Table 3, whereby switching control of the current phase arrangement of the stator coils 9 between high polarity (4 poles), and low polarity (2 poles) is realized.

Next, effects of the pole-number-changing rotary electric machine in the third embodiment will be described. In the rotary electric machine 1 of the third embodiment shown in FIG. 8, a number of stator slots corresponding to each pole/each phase is 1. Furthermore, the number of phases m is equal to 3.

Hence, with the third embodiment, as a current phase degree of freedom, which is the number of current phases per pole pair controllable by the n-group inverter, is 6 at the time of high polarity driving, the current phase degree of freedom can be improved over conventional pole-number-changing rotary electric machines (in PTL 2, for example, a current phase degree of freedom=3). As a result, a phase difference between mutually adjacent different current phases can be set to 360°/6=60°, allowing a winding factor of the rotary electric machine 1 to be improved.

In the pole-number-changing rotary electric machine shown in FIG. 8, the number of stator slots corresponding to each pole/each phase is assumed to be 1, therefore, a maximum value of 1 can be obtained as a distributed winding factor $k_{wd}$. However, with PTL 2, the current phase degree of freedom during high polarity is 3, therefore, if a winding factor is calculated under the same conditions as in the third embodiment, the winding factor reflects a low value of 0.866.

As described above, with the third embodiment, the current phases flowing into the stator coils are switch controlled such that the current phase degree of freedom, which is the number of current phases per pole pair controllable by the inverters 21 to 24, is equal to the number of groups n×the number of phases m/2=6 during high polarity, and the number of groups n×the number of phases m=12 during low polarity. As a result, a pole-number-changing rotary electric machine that, without using a winding changeover mechanism, has excellent torque-current characteristics even during high polarity, and a driving method for the pole-number-changing rotary electric machine, can be obtained.

Example 4

Figure 10:
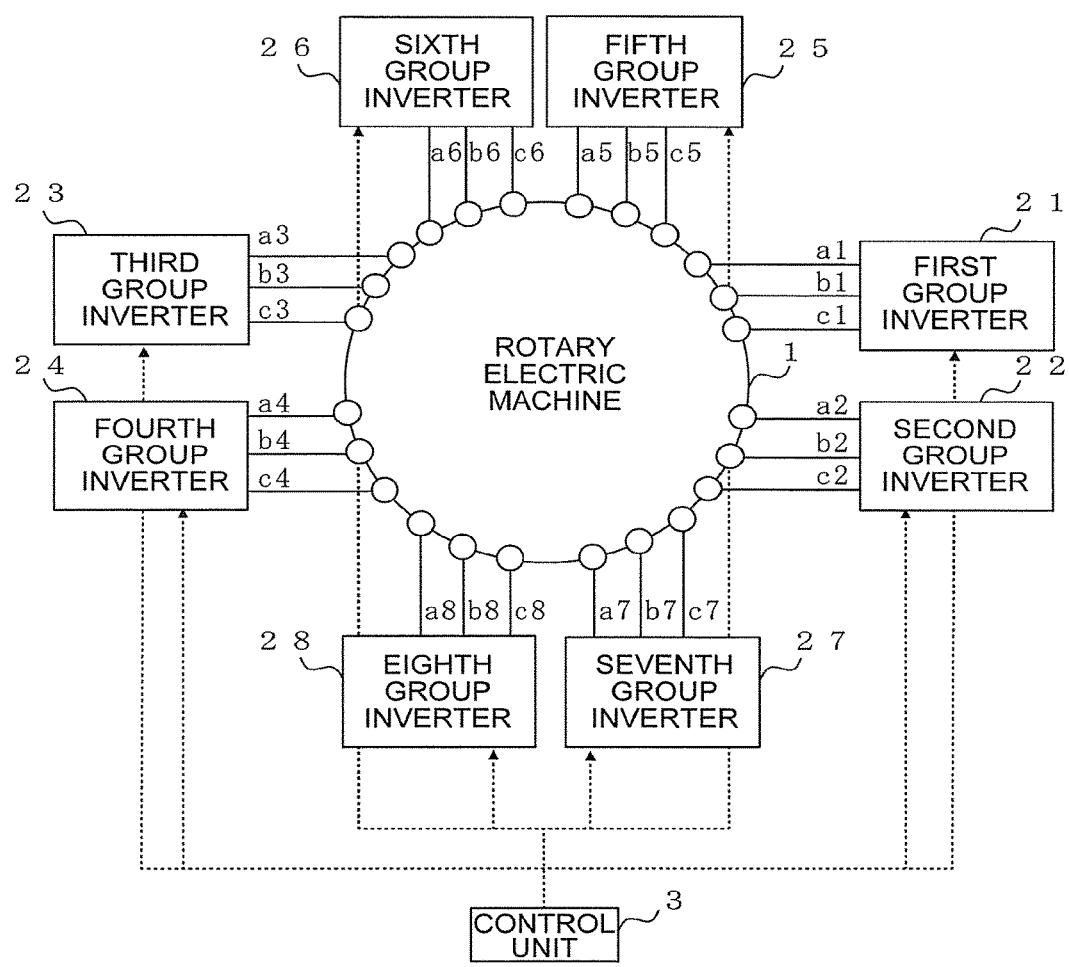
FIG. 10 is an outline drawing showing connections between a rotary electric machine and inverters in a pole-number-changing rotary electric machine according to a fourth embodiment of the present invention.

Stator coils 9 of a rotary electric machine 1 according to a fourth embodiment have, as shown in FIG. 10, 8 groups×3 phases=24 lead-out ports, and current of respectively corresponding groups and phases is supplied thereto from 8-group 3-phase inverters 21 to 28.

First, a configuration of a pole-number-changing rotary electric machine in the fourth embodiment will be described. The stator coils 9 of the rotary electric machine 1 of the fourth embodiment have, as shown in FIG. 10, 8 groups×3 phases=24 lead-out ports, and current having respectively corresponding current phases is supplied thereto from the 8-group 3-phase inverters 21 to 28.

That is to say, a first group (a1, b1, c1) of the stator coils 9 are connected to the inverter 21, a second group (a2, b2, c2) of the stator coils 9 are connected to the inverter 22, a third group (a3, b3, c3) of the stator coils 9 are connected to the inverter 23, a fourth group (a4, b4, c4) of the stator coils 9 are connected to the inverter 24, a fifth group (a5, b5, c5) of the stator coils 9 are connected to the inverter 25, a sixth group (a6, b6, c6) of the stator coils 9 are connected to the inverter 26, a seventh group (a7, b7, c7) of the stator coils 9 are connected to the inverter 27, and an eighth group (a8, b8, c8) of the stator coils 9 are connected to the inverter 28.

Further, adjacent current phases in the first group (a1, b1, c1) are each separated by a phase difference of 360°/3=120°. The same applies to the second group (a2, b2, c2), the third group (a3, b3, c3), the fourth group (a4, b4, c4), the fifth group (a5, b5, c5), the sixth group (a6, b6, c6), the seventh group (a7, b7, c7), and the eighth group (a8, b8, c8).

FIG. 11 is a pattern diagram showing current phase arrangements of the stator coils 9 in the pole-number-changing rotary electric machine according to the fourth embodiment of the present invention. FIG. 11A shows a current phase arrangement of two pole pairs during high polarity (4 poles), and FIG. 11B shows a current phase arrangement of one pole pair during low polarity (2 poles).

A number of stator slots=24 stator slots 8 are arranged in a stator 6 at regular intervals in the mechanical angle direction, and the stator coils 9 are housed in the stator slots 8.

A control unit 3 of the inverters 21 to 28 controls current phases flowing into the stator coils 9 such that current phase arrangements of the current flowing through the stator coils 9 during high polarity and during low polarity reflect the current phase arrangements shown in FIG. 11A and FIG. 11B respectively.

More specifically, the control unit 3 controls the current phases of the current flowing through the stator coils 9 such that, in FIG. 11, a number of poles at a time of high polarity driving is twice a number of poles at a time of low polarity driving, and a number of different current phases used in the stator slots 8 that corresponds to one pole pair is equal to a number of groups n×a number of phases m/2=12 at the time of high polarity driving and the number of groups n×the number of phases m=24 at the time of low polarity driving.

Next, an operation of the pole-number-changing rotary electric machine in the fourth embodiment will be described. Table 4 shows a current phase order of the current supplied to the rotary electric machine 1 by the inverters 21 to 28 in the pole-number-changing rotary electric machine according to the fourth embodiment of the present invention. The control unit 3 of the inverters 21 to 28 switch controls the current phases of the current flowing into the stator coils 9 of the rotary electric machine 1 in accordance with Table 4.

TABLE 4

|  |  | Output Line Code | High Polarity (4 poles) | Low Polarity (2 poles) |
|---|---|---|---|---|
| Group 1 Inverter | | a1 | $A_1$ | $A_1$ |
| | | b1 | $B_1$ | $C_1$ |
| | | c1 | $C_1$ | $B_1$ |
| Group 2 Inverter | | a2 | $G_2$ | $D_2$ |
| | | b2 | $H_2$ | $F_2$ |
| | | c2 | $I_2$ | $E_2$ |
| Group 3 Inverter | | a3 | $M_3$ | $G_3$ |
| | | b3 | $N_3$ | $I_3$ |
| | | c3 | $O_3$ | $H_3$ |
| Group 4 Inverter | | a4 | $S_4$ | $J_4$ |
| | | b4 | $T_4$ | $L_4$ |
| | | c4 | $U_4$ | $K_4$ |
| Group 5 Inverter | | a5 | $A_5$ | $N_5$ |
| | | b5 | $B_5$ | $M_5$ |
| | | c5 | $C_5$ | $O_5$ |
| Group 6 Inverter | | a6 | $G_6$ | $Q_6$ |
| | | b6 | $H_6$ | $P_6$ |
| | | c6 | $I_6$ | $R_6$ |
| Group 7 Inverter | | a7 | $M_7$ | $T_7$ |
| | | b7 | $N_7$ | $S_7$ |
| | | c7 | $O_7$ | $U_7$ |
| Group 8 Inverter | | a8 | $S_8$ | $W_8$ |
| | | b8 | $T_8$ | $V_8$ |
| | | c8 | $U_8$ | $X_8$ |

Hence, switching control of the current phase arrangement of the stator coils 9 so as to reflect the current phase arrangement shown in FIG. 11A during high polarity and the current phase arrangement shown in FIG. 11B during low polarity, can be realized without using a winding changeover mechanism.

FIG. 12 is a pattern diagram showing magnetomotive force waveforms in the pole-number-changing rotary electric machine according to the fourth embodiment of the present invention. FIG. 12A shows a magnetomotive force waveform of the current phase arrangement during high polarity shown in FIG. 11A, and FIG. 12B shows a magnetomotive force waveform of the current phase arrangement during low polarity shown in FIG. 11B.

Note that, for the magnetomotive force waveforms shown in FIG. 12, a number of coil turns is the same for all the stator coils 9 in the stator slots 8, and I×cos(0°), I×cos(−120°), I×cos(−240°), I×cos(−15°), I×cos(−135°), I×cos(−255°), I×cos(−30°), I×cos(−150°), I×cos(−270°), I×cos(−45°), I×cos(−165°), I×cos(−285°), I×cos(−60°), I×cos(−180°), I×cos(−300°), I×cos(−75°), I×cos(−195°), I×cos(−315°), I×cos(−90°), I×cos(−210°), I×cos(−330°), I×cos(−105°), I×cos(−225°), and I×cos(−345°) currents are flowing through an A phase, a B phase, a C phase, a D phase, an E phase, an F phase, a G phase, an H phase, an I phase, a J phase, a K phase, an L phase, an M phase, an N phase, an O phase, a P phase, a Q phase, an R phase, an S phase, a T phase, a U phase, a V phase, a W phase, and an X phase respectively. In other words, absolute values of the magnetomotive forces generated by the stator coils 9 and corresponding to each of the stator slots 8 are all the same.

It can be understood that, when a spatial order of a slot full cycle (#1-#24) is k (k being a natural number), the magnetomotive force waveform during high polarity shown in FIG. 12A is a waveform mainly including a spatial order of 2k, whereas the magnetomotive force waveform during low polarity shown in FIG. 12B is a waveform mainly including a spatial order of k.

In other words, it can be understood that the control unit 3 of the inverters 21 to 28 switch controls the current phases of the current flowing into the stator coils 9 of the rotary electric machine 1 in accordance with Table 4, whereby switching control of the current phase arrangement of the stator coils 9 between high polarity (4 poles), and low polarity (2 poles) is realized.

Next, effects of the pole-number-changing rotary electric machine in the fourth embodiment will be described. In the rotary electric machine 1 of the fourth embodiment shown in FIG. 11, a number of stator slots corresponding to each pole/each phase is 1. Furthermore, the number of phases m is equal to 3.

Hence, with the fourth embodiment, as a current phase degree of freedom, which is the number of current phases per pole pair controllable by the n-group inverter, is 12 at the time of high polarity driving, the current phase degree of freedom can be improved over conventional pole-number-changing rotary electric machines (in PTL 2, for example, a current phase degree of freedom=3). As a result, a phase difference between mutually adjacent different current phases can be set to 360°/12=30°, allowing a winding factor of the rotary electric machine 1 to be improved.

In the pole-number-changing rotary electric machine shown in FIG. 11, the number of stator slots corresponding to each pole/each phase is assumed to be 1, therefore, a maximum value of 1 can be obtained as a distributed winding factor $k_{wd}$. However, with PTL 2, the current phase degree of freedom during high polarity is 3, therefore, if a winding factor is calculated under the same conditions as in the fourth embodiment, the winding factor reflects a low value of 0.866.

As described above, with the fourth embodiment, the current phases flowing into the stator coils are switch controlled such that the current phase degree of freedom, which is the number of current phases per pole pair controllable by the inverters 21 to 28, is equal to the number of groups n×the number of phases m/2=12 during high polarity, and the number of groups n×the number of phases m=24 during low polarity. As a result, a pole-number-changing rotary electric machine that, without using a winding changeover mechanism, has excellent torque-current characteristics even during high polarity, and a driving method for the pole-number-changing rotary electric machine, can be obtained.

In addition, by configuring stator slots 8 such that, with the number of stator slots 8 being $n_s$, $n_s$/(a number of groups n×a number of phases m) is equal to a natural number, a number of stator slots corresponding to each pole/each phase can be set to a natural number, allowing interference between different current phases in the slots to be suppressed.

Moreover, in FIG. 3 and FIG. 6, the stator coils 9 housed in one slot are assumed to be of two types, however, this is not necessarily the case, and any configuration in which a coil arrangement is such that a spatial order of a magnetomotive force waveform during high polarity is twice that of a spatial order of a magnetomotive force waveform during low polarity is sufficient. For example, the stator coils 9 housed in one slot may also be of one type.

In the first embodiment, a number of stator slots is set to 48 and the number of the stator slots corresponding to each pole/each phase during high polarity is set to 2, however, this is not necessarily the case, and any configuration in which a distributed winding factor during high polarity is expressed by the abovementioned equation (1) is sufficient. For example, pole number changing between 2 poles and 4 poles may also be realized by setting the number of stator slots to 12 and the number of the stator slots corresponding to each pole/each phase during high polarity to 1, and switching the respective wiring destinations, i.e. inverters 21 to 24, to which each pole pair is connected, for each pole pair.

Further, there is no limit on a number of rotor slots and a number of secondary conductors of a rotor 10, and a number of rotor slots and a number of secondary conductors of the rotor 10 are not limited to the numbers indicated in FIG. 1. Moreover, the rotor 10 is not limited to a squirrel-cage rotor as indicated in FIG. 1. Where a rotary electric machine 1 is an induction machine, the rotor 10 itself does not have a magnetic pole, however, a rotor having an internal permanent magnet so as to have a magnetic pole itself is also applicable in the present invention.

The invention claimed is:

1. A pole-number-changing rotary electric machine comprising:
   a rotary electric machine provided with a stator in which stator slots are arranged at regular intervals in a mechanical angle direction and a rotor rotated by magnetomotive forces generated by a current flowing through stator coils housed in the stator slots;
   an n-group inverter for supplying an m-phase current to the stator coils; and
   a controller for controlling the n-group inverter,
   each of the magnetomotive forces corresponding to the stator slots being arranged at regular intervals, and a number of poles in the pole-number-changing rotary electric machine being changed between a first number of poles and a second number of poles, wherein the second number of poles is smaller than the first number of poles, wherein the controller controls current phases of the current flowing through the stator coils such that a current phase degree of freedom, which is a number of current phases used in stator slots that correspond to one pole pair controllable by the n-group inverter, is equal to a number of groups n×a number of phases m/2 at a time of a first polarity driving corresponding to the first number of poles and is equal to a number of groups n×the number of phases m at a time of a second polarity driving corresponding to the second number of poles, where the number of groups n is 4 or a multiple of 4 and the number of phases m is 3 or a natural number greater than 3 and m and n are prime numbers relative to each other.

2. The pole-number-changing rotary electric machine according to claim 1, wherein the controller controls current phases of a current flowing through the stator coils such that a number of poles at the time of the first polarity driving is twice a number of poles at the time of the second polarity driving, and a number of different current phases used in the stator slots that corresponds to one pole pair is equal to a number of groups n×a number of phases m/2 at the time of the first polarity driving and the number of groups n×the number of phases m at the time of the second polarity driving.

3. The pole-number-changing rotary electric machine according to claim 1, wherein the controller controls current phases of a current flowing through the stator coils such that a number of poles at the time of the first polarity driving is twice a number of poles at the time of the second polarity driving, and a number of different current phases used in the stator slots that corresponds to one pole pair is the same at the time of the first polarity driving and at the time of the second polarity driving and equal to a number of groups n×a number of phases m/2.

4. The pole-number-changing rotary electric machine according to claim 1, wherein when a number of stator slots of the stator slots is set to $n_s$, $n_s$/(a number of groups n×a number of phases m) is a natural number.

5. The pole-number-changing rotary electric machine according to claim 4, wherein the number of groups is n=4 and the number of phases is m=3.

6. The pole-number-changing rotary electric machine according to claim 4, wherein the number of groups is n=4 and the number of phases is m=5.

7. The pole-number-changing rotary electric machine according to claim 4, wherein the number of groups is n=8 and the number of phases is m=3.

8. The pole-number-changing rotary electric machine according to claim 1, wherein the rotary electric machine is an induction machine.

9. A driving method for a pole-number-changing rotary electric machine including a rotary electric machine provided with a stator in which stator slots are arranged at regular intervals in a mechanical angle direction and a rotor rotated by magnetomotive forces generated by a current flowing through stator coils housed in the stator slots, the driving method comprising:

supplying, by an n-group inverter, an m-phase current to the stator coils; and controlling, by circuitry, the n-group inverter, each of the magnetomotive forces corresponding to the stator slots being arranged at regular intervals, and a number of poles in the pole-number-changing rotary electric machine being changed between a first number of poles and a second number of poles, wherein the second number of poles is smaller than the first number of poles; and performing, by the circuitry, current supply in which an m-phase current is supplied to the stator coils by the n-group inverter, and in the current supply:

at the time of a polarity driving corresponding to the second number, current phases of the current flowing through the stator coils are controlled such that a current phase degree of freedom, which is a number of current phases used in stator slots that correspond to one pole pair controllable by the n-group inverter, is equal to a number of groups n×a number of phases m, where the number of groups n is 4 or a multiple of 4 and the number of phases m is 3 or a natural number greater than 3 and m and n are prime numbers relative to each other, and at the time of a polarity driving corresponding to the first number, the current phases of the current flowing into the stator coils are changed such that the current phase degree of freedom is equal to the number of groups n×the number of phases m/2.

10. A pole-number-changing rotary electric machine comprising:

a rotary electric machine provided with a stator in which stator slots are arranged at regular intervals in a mechanical angle direction and a rotor rotated by magnetomotive forces generated by a current flowing through stator coils housed in the stator slots;

an n-group inverter configured to supply an m-phase current to the stator coils; and circuitry configured to control the n-group inverter, each of the magnetomotive forces corresponding to the stator slots being arranged at regular intervals, and a number of poles in the pole-number-changing rotary electric machine being changed between a first number of poles and a second number of poles, wherein the second number of poles is smaller than the first number of poles, wherein the circuitry controls current phases of the current flowing through the stator coils such that a current phase degree of freedom, which is a number of current phases used in stator slots that correspond to one pole pair controllable by the n-group inverter, is equal to a number of groups n×a number of phases m/2 at a time of a polarity driving corresponding to the first number and is equal to a number of groups n×the number of phases m at a time of a polarity driving corresponding to the second number, where the number of groups n is 4 or a multiple of 4 and the number of phases m is 3 or a natural number greater than 3 and m and n are prime numbers relative to each other.

* * * * *